United States Patent
Hulst et al.

(10) Patent No.: US 10,266,037 B2
(45) Date of Patent: Apr. 23, 2019

(54) SLIDER WINDOW ASSEMBLY WITH TWO PIECE END STOP

(71) Applicant: MAGNA MIRRORS OF AMERICA, INC., Holland, MI (US)

(72) Inventors: Michael J. Hulst, Holland, MI (US); Peggy L. Gustafson, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 167 days.

(21) Appl. No.: 15/354,007

(22) Filed: Nov. 17, 2016

(65) Prior Publication Data

US 2017/0144512 A1    May 25, 2017

Related U.S. Application Data

(60) Provisional application No. 62/258,721, filed on Nov. 23, 2015.

(51) Int. Cl.
| | |
|---|---|
| *E05D 15/06* | (2006.01) |
| *B60J 1/18* | (2006.01) |
| *E05F 5/00* | (2017.01) |

(52) U.S. Cl.
CPC ........ *B60J 1/1853* (2013.01); *E05D 15/0621* (2013.01); *E05F 5/003* (2013.01)

(58) Field of Classification Search
CPC .. B60J 1/1853; B60J 1/16; B60J 1/007; E05D 15/0621; E05F 5/003; E06B 3/4618; E05B 83/40; E05C 9/042; E05Y 2900/55
USPC ............ 49/413, 380, 360, 70, 489.1, 479.1, 49/490.1, 124, 125, 495.1
See application file for complete search history.

(56) References Cited

U.S. PATENT DOCUMENTS

| | | | |
|---|---|---|---|
| 957,728 | A | 5/1910 | Bliss |
| 1,204,702 | A | 11/1916 | Schupp |
| 2,762,675 | A | 9/1956 | Janows |
| 2,858,408 | A | 10/1958 | Barroero |
| 2,912,714 | A | 11/1959 | Rich |
| 2,962,773 | A | 12/1960 | Heller |
| 3,177,989 | A | 4/1965 | Di Chiaro |
| 3,237,250 | A | 3/1966 | Scoville |
| 3,379,859 | A | 4/1968 | Marriott |
| 3,508,361 | A | 4/1970 | Ryder |
| 3,715,707 | A | 2/1973 | Anderson |
| 3,893,260 | A | 7/1975 | Cadiou |
| 3,898,427 | A | 8/1975 | Levin et al. |
| 3,911,245 | A | 10/1975 | O'Shaughnessy |

(Continued)

*Primary Examiner* — Chi Q Nguyen
(74) *Attorney, Agent, or Firm* — Honigman LLP

(57) ABSTRACT

A slider window assembly for a vehicle includes a movable window panel that is movable at a fixed window panel between closed and opened positions. A lower end region of the movable window panel moves along a channel portion of a lower rail and an end stop is disposed at an end of the channel portion. The end stop includes a rigid base portion attached at the lower rail and a resilient elastomeric stop portion attached at the base portion and configured to engage an end portion of the movable window panel when the movable window panel is moved to its fully opened or fully closed position. The base portion and the stop portion are separately formed in separate forming processes. When the base portion of the end stop is attached at the lower rail, the stop portion is fixedly attached at the base portion and is not removable therefrom.

20 Claims, 6 Drawing Sheets

(56) References Cited

U.S. PATENT DOCUMENTS

| | | |
|---|---|---|
| 3,964,068 A | 6/1976 | Torii et al. |
| 3,995,142 A | 11/1976 | Ciardelli et al. |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenker |
| 4,635,398 A | 1/1987 | Nakamura |
| 4,674,231 A | 6/1987 | Radek et al. |
| 4,738,052 A | 4/1988 | Yoshida |
| 4,723,809 A | 9/1988 | Kida et al. |
| 4,785,583 A | 11/1988 | Kawagoe et al. |
| 4,883,940 A | 11/1989 | Tokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Taijima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A | 1/2000 | Ray et al. |
| 6,026,611 A | 2/2000 | Ralston et al. |
| 6,038,819 A | 3/2000 | Klein |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,293,609 B1 | 9/2001 | Xu et al. |
| 6,324,788 B1 | 12/2001 | Koneval et al. |
| 6,328,243 B1 | 12/2001 | Yamamoto |
| 6,490,832 B1 | 12/2002 | Fischbach et al. |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 6/2008 | Lahnala |
| 7,400,435 B2 | 7/2008 | Byers et al. |
| 7,608,949 B2 | 10/2009 | Busch |
| 7,626,749 B2 | 12/2009 | Baur et al. |
| 7,871,272 B2 | 1/2011 | Firman et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,402,695 B2 | 3/2013 | Smith et al. |
| 8,881,458 B2 * | 11/2014 | Snider .................... B60J 1/1853 49/380 |
| 8,938,914 B2 | 1/2015 | Hulst et al. |
| 9,896,026 B2 * | 2/2018 | Snider .................... B60Q 1/268 |
| 2003/0074842 A1 | 4/2003 | Eckhardt et al. |
| 2003/0140562 A1 | 7/2003 | Staser et al. |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Reginier et al. |
| 2004/0098919 A1 | 5/2004 | Bourque et al. |
| 2006/0032140 A1 | 2/2006 | Arimoto et al. |
| 2006/0061008 A1 | 3/2006 | Karner et al. |
| 2006/0107600 A1 | 5/2006 | Nestell et al. |
| 2006/0130405 A1 | 6/2006 | Hemond et al. |
| 2007/0209283 A1 | 9/2007 | Ostrowski et al. |
| 2007/0277443 A1 | 12/2007 | Dery et al. |
| 2008/0060275 A1 | 3/2008 | Recker |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2009/0217595 A1 | 9/2009 | Grimm et al. |
| 2009/0322705 A1 | 12/2009 | Halsey, IV |
| 2010/0122497 A1 | 5/2010 | Lahnala |
| 2010/0146859 A1 | 6/2010 | Gipson et al. |
| 2010/0154312 A1 | 6/2010 | Gipson et al. |
| 2010/0182143 A1 | 7/2010 | Lynam |
| 2010/0240229 A1 | 9/2010 | Firman et al. |
| 2010/0263290 A1 | 10/2010 | Pawloski et al. |
| 2010/0263291 A1 | 10/2010 | Bello et al. |
| 2011/0030276 A1 | 2/2011 | Smith et al. |
| 2012/0117880 A1 | 3/2012 | Lahnala et al. |
| 2012/0091113 A1 | 4/2012 | Bennett et al. |
| 2012/0091114 A1 | 4/2012 | Ackerman et al. |
| 2012/0139289 A1 | 6/2012 | Lahnala |
| 2013/0174488 A1 | 7/2013 | Snider et al. |
| 2013/0255156 A1 | 10/2013 | Snider |
| 2013/0283693 A1 * | 10/2013 | Huizen ................ E05F 11/488 49/123 |

(56) References Cited

U.S. PATENT DOCUMENTS

2014/0047772 A1    2/2014   Hulst
2015/0167372 A1    6/2015   Hulst et al.
2017/0144512 A1*   5/2017   Hulst .................... B60J 1/1853

* cited by examiner

SLIDER WINDOW ASSEMBLY WITH TWO PIECE END STOP

CROSS REFERENCE TO RELATED APPLICATION

The present application claims the filing benefits of U.S. provisional application Ser. No. 62/258,721, filed Nov. 23, 2015, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

SUMMARY OF THE INVENTION

The present invention provides a rear slider window assembly that has upper and lower channels or rails attached at one or more fixed window panels for slidably receiving a movable window panel. The lower channel includes an end stop disposed at an end thereof for engaging the movable window panel (or carrier of the glass panel) when the movable window panel is moved to its fully opened or fully closed position. The end stop comprises a two-piece construction having a durable non-flexible plastic base portion that attaches at the lower channel and a softer, elastomeric or rubber end portion for engaging the movable window panel.

According to an aspect of the present invention, a rear slider window assembly of a vehicle (such as a pickup truck or the like) includes a frame portion having an upper rail and a lower rail. First and second spaced apart fixed window panels are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. The lower rail comprises an elongated generally U-shaped channel portion with end stops disposed at or near the ends thereof. The channel portion extends at least partially along the first and second fixed window panels and the opening. A carrier is established at a lower portion of the movable window panel and is configured to be received in, be supported by and to move along the lower rail. The end stops are configured to engage the carrier when the movable window panel is moved to its fully opened or fully closed position. The end stops comprise a rigid plastic base portion that is attached at the lower rail, and a resilient compressible elastomeric end portion that is detachably attached at the base portion and that is configured to engage the carrier when the movable window panel is moved to its fully opened or fully closed position. The base portion and end portion may be configured so that the end portion, when attached at the base portion and when the base portion is attached at the lower rail, the end portion cannot be removed from the base portion.

These and other objects, advantages, purposes and features of the present invention will become apparent upon review of the following specification in conjunction with the drawings.

DESCRIPTION OF THE PREFERRED EMBODIMENTS

Figure 1:
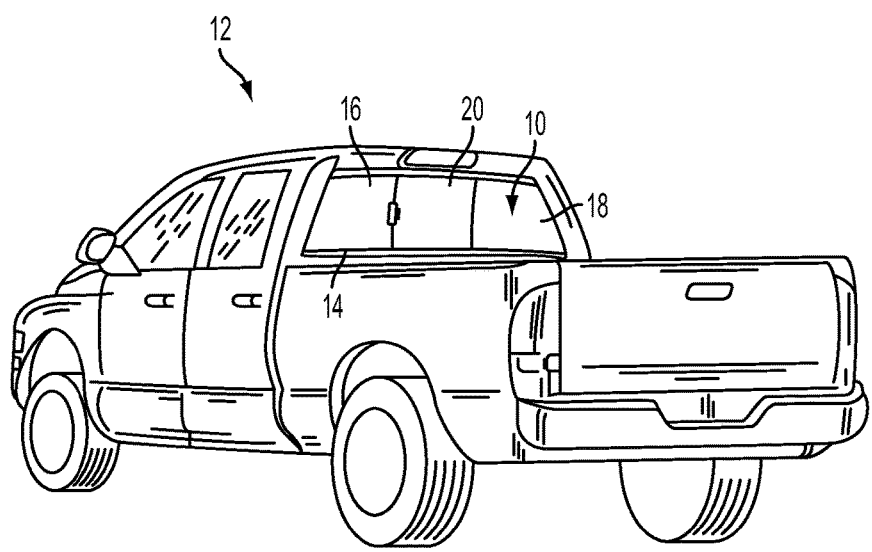
FIG. 1 is a rear perspective view of a pickup truck having a rear slider window assembly in accordance with the present invention.
Figure 2:
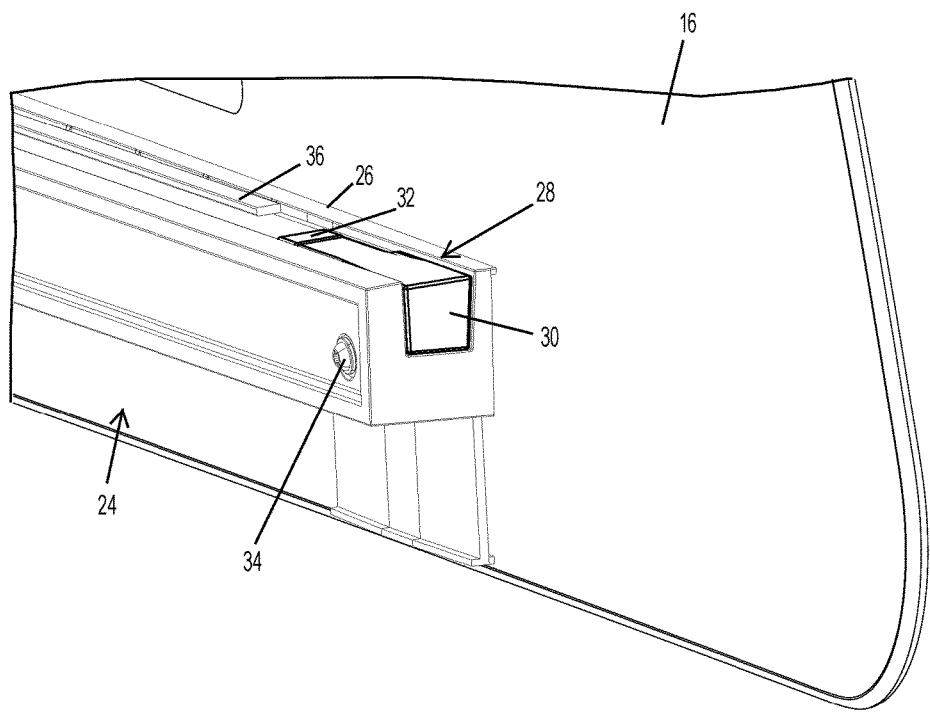
FIG. 2 is an enlarged perspective view of a lower corner region of the rear slider window assembly of the present invention.
Figure 3:
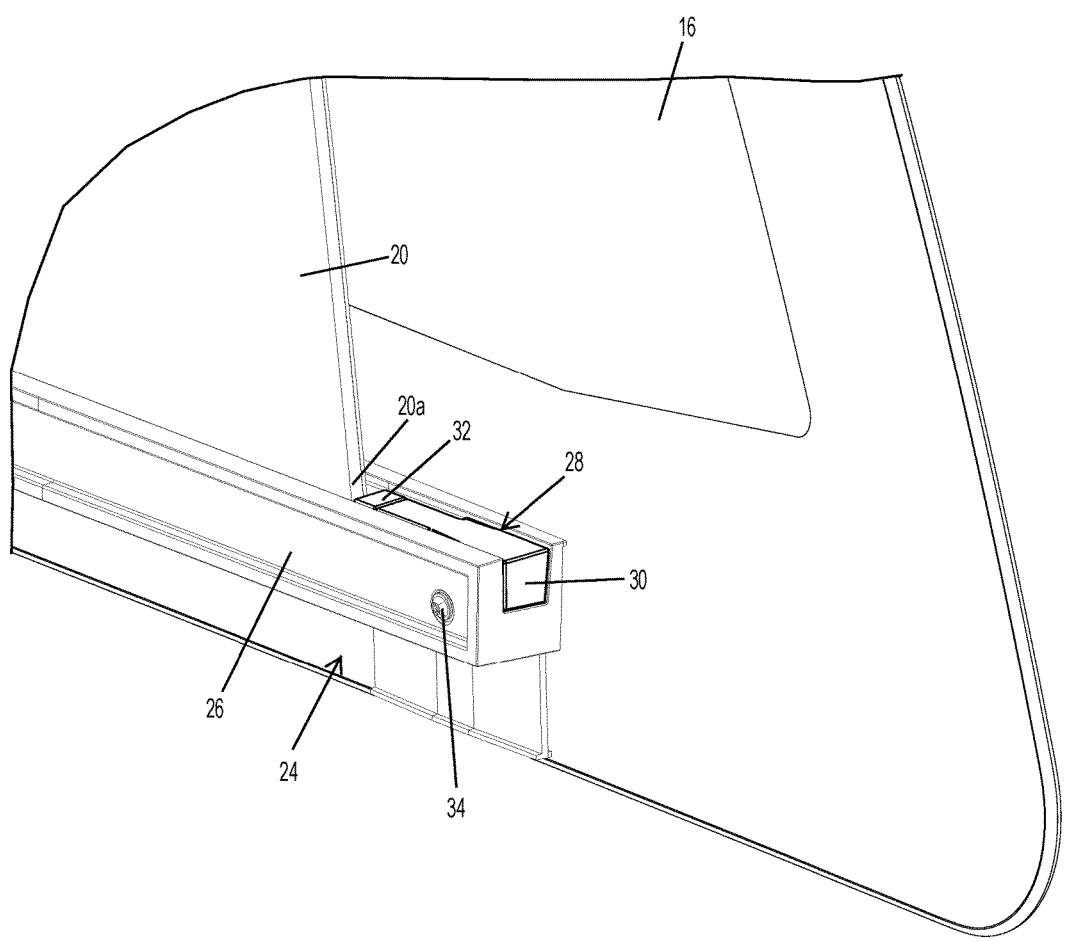
FIG. 3 is an enlarged perspective view of the lower corner region of FIG. 2, shown with the movable window panel opened and engaging the end stop.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1 and 2). Frame 14 comprises an upper rail (not shown) and a lower rail 24, with the upper and lower edge regions of movable window panel 20 movably or slidably received in and along the respective upper and lower rails. Lower rail 24 comprises an elongated generally U-shaped channel portion 26 disposed generally horizontally along the rear slider window and spanning at least part of each of the fixed window panels 16, 18, with an end stop 28 disposed at an end region of the channel portion 26 (and optionally with another end stop disposed at or near the opposite end region of the channel portion). The lower edge region 20a of the movable window panel 20 is received in or attached to a carrier, which is movably received in channel portion 26 of lower rail 24 and is movable or slidable along channel portion 26 as the movable window panel 20 is moved between its opened and closed positions, as discussed below. The carrier (or the side edge of the movable window panel) engages the end stop 28 when moved to its fully opened or fully closed position. The end stop 28 comprises a two piece construction having a rigid plastic base portion 30 that is attached at the lower rail 24 and a resilient compressible elastomeric stop portion or end portion 32 that is detachably attached at the base portion 30 and that is configured to engage the carrier or movable window panel when the movable window panel is moved to its fully opened or fully closed position, as discussed below.

Window assembly 10 may comprise a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the fixed window panels may comprise two separate spaced apart fixed window panels that define the opening therebetween (and with upper and lower appliqués or trim or filler panels or elements disposed at the upper and lower regions of the opening and between the fixed window panels), while remaining within the spirit and scope of the present invention.

Slider or movable window panel 20 is movable along lower rail 24 and the upper rail of frame portion 14 to open and close the aperture or opening, such as in a manner similar to known slider window assemblies. Slider window panel 20 may be disposed at a lower carrier, which may receive the lower perimeter edge region 20a of the slider window panel 20 therein and is slidably or movably received in the channel portion 26 of the lower rail 24. In the illustrated embodiment, the movable or slider window panel 20 is movable such as via manual pushing or pulling at the window panel, whereby the elastomeric stop or end portions of the end stops provides a soft stop at the respective fully opened and fully closed positions of the window panel. Optionally, the movable window panel may be movable in response to actuation of a drive motor of a drive motor assembly or system, which may move cables or wires of cable assemblies relative to a sheath of the cable assemblies or the like to impart horizontal movement of the slider window panel 20 along the rails. Optionally, such a drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

Lower rail 24 is disposed generally horizontally along the rear slider window and spanning at least part of each of the fixed window panels 16, 18, with end stops 28 disposed in the channel 26 at opposite ends of a guide element 36 that receives the lower edge region of the movable window panel 20 and/or the carrier attached at the lower edge region of the movable window panel 20 and that establishes the range of travel of the movable window panel 20. The carrier is movably received in the guide element 36 of the channel portion 26 of lower rail 24 and is movable or slidable along the guide element 36 and channel portion 26 as the movable window panel 20 is moved between its opened and closed positions. The end stops function to provide a soft stop when the window is fully opened or closed. Optionally, the end stops 28 may also function to anchor the ends of the cable sheath (for powered slider window assemblies) and/or to anchor or retain the ends of the guide element in the channel portion (such as by utilizing aspects of the window assemblies described in U.S. Pat. No. 8,938,914, which is hereby incorporated herein by reference in its entirety).

Figure 4:
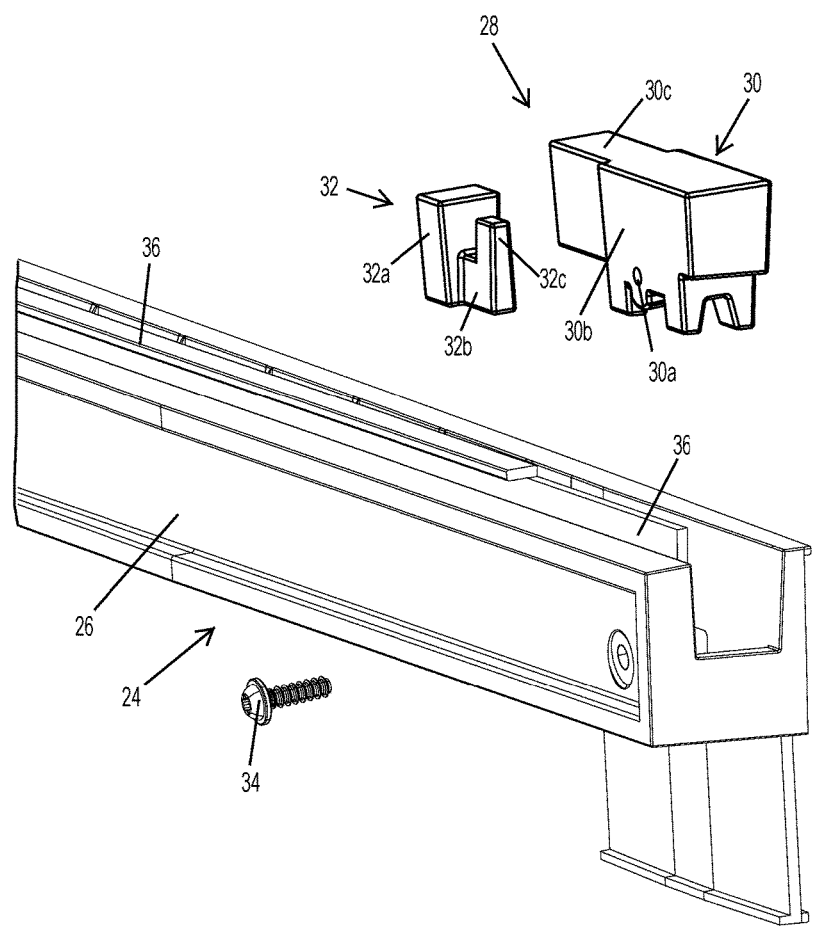
FIG. 4 is an exploded perspective view of the end stop and channel of FIG. 2.

As best seen with reference to FIG. 4, the channel portion 26 is an elongated generally U-shaped channel having a base or lower wall and a pair of spaced apart generally vertical walls extending upwardly from the base or lower wall. The guide element comprises an elongated element that is received within the channel and has a generally U-shaped portion that receives the carrier therein. The guide element may comprise a guide element similar to those described in U.S. Pat. No. 8,915,018, which is hereby incorporated herein by reference in its entirety.

The end stops 28 may be secured relative to the channel portion 26 via any suitable means, such as via a fastener 34 that is inserted through an outer wall 26a of channel portion 26 and into a threaded passageway 30a of the base portion 30 of the respective end stop 28. The end stops 28 are generally the same or similar in shape and construction (and may be the identical or common part merely flipped 180 degrees, with the threaded passageway optionally extending entirely through the base portion 30), such that only one end stop 28 will be described in detail herein.

In the illustrated embodiment, the base portion 30 of end stop 28 is sized to be received in the channel portion 26 and includes a wider portion 30b that is sized to be about the same width or slightly narrower than the width of the channel of channel portion 26 and a narrower guide element retaining portion 30c that protrudes from the wider base portion 30b and is sized to be received in the end of the guide element 36. The base portion comprises a molded rigid plastic element formed (such as by injection molding) of a rigid polymeric material, such as an engineered plastic material or the like.

Figure 5:
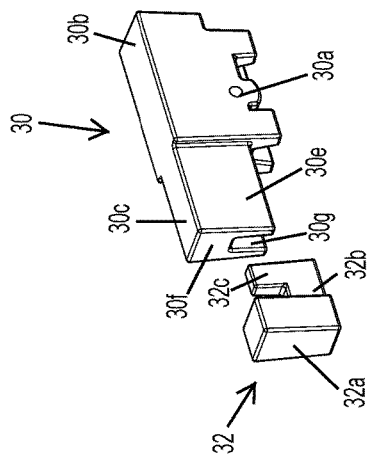
FIG. 5 is an exploded perspective view of the end stop of the present invention.
Figure 6:
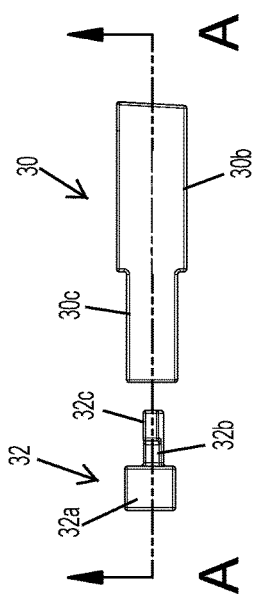
FIG. 6 is a side elevation of the end stop of FIG. 5.
Figure 7:
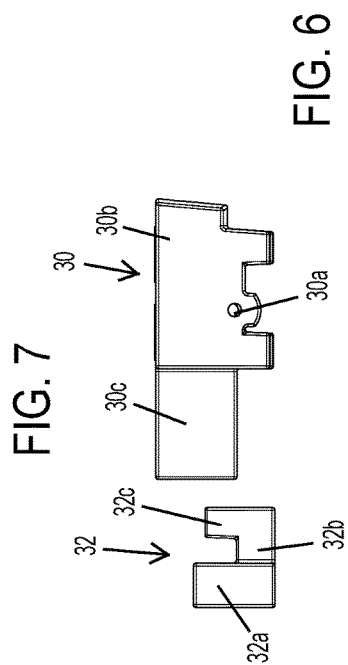
FIG. 7 is a top plan view of the end stop of FIG. 5.
Figure 7A:
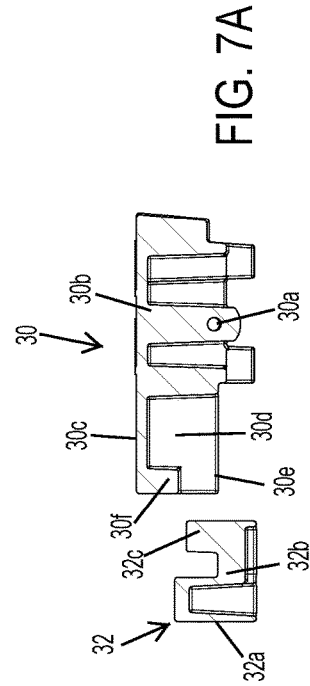
FIG. 7A is a sectional view of the exploded end stop, taken along the line A-A in FIG. 7.
Figure 11:
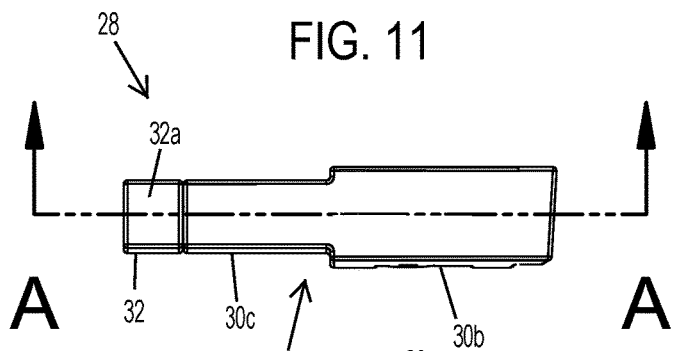
FIG. 11 is a top plan view of the end stop of FIG. 8.
Figures 8, 9:
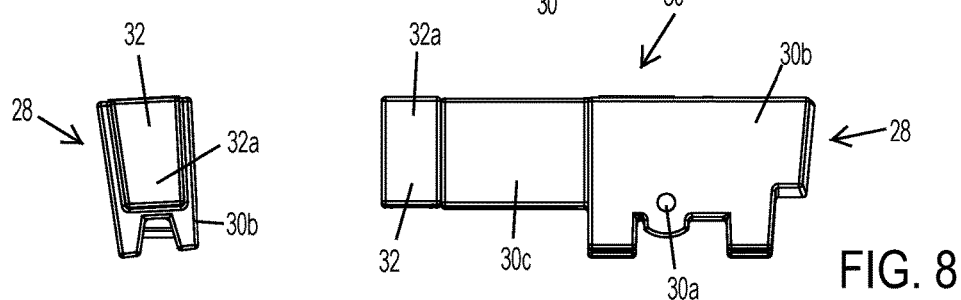
FIG. 8 is a side elevation of the end stop of the present invention, as assembled.
FIG. 9 is an end elevation of the end stop of FIG. 8.
Figure 10:
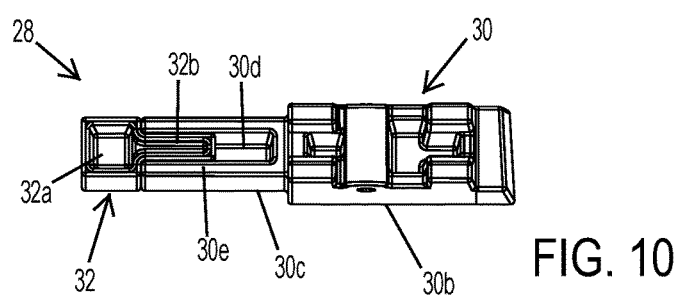
FIG. 10 is a bottom plan view of the end stop of FIG. 8.
Figure 11A:
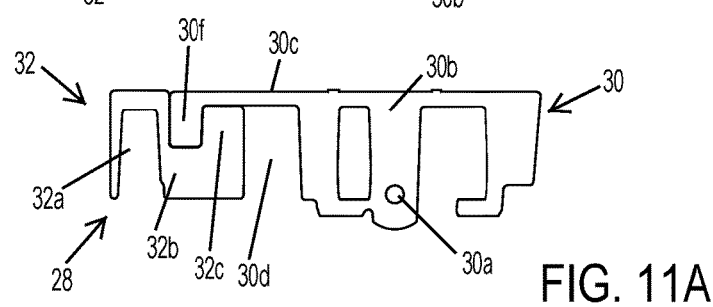
FIG. 11A is a sectional view of the end stop, taken along the line A-A in FIG. 11.

As best seen with reference to FIGS. 5, 7A and 11A, the narrower portion 30c of base portion 30 comprises a generally hollow part having an inner cavity 30d defined by side walls 30e and a downward protruding lip or end wall 30f at the end of the narrower portion 30c. The lip or end wall 30f includes a notch 30g thereat. The cavity is configured to receive a portion 32c of the soft stop portion or end portion 32 to retain the stop portion 32 at the end of the base portion 30.

As shown in FIGS. 7A and 11A, stop portion 32 comprises a generally hollow end portion 32a and an attaching portion or arm 32b that extends from hollow end portion 32a and includes an upwardly extending portion 32c. The stop portion 32 thus may be detachably attached at the end of the narrower portion 30c of base portion 30 by inserting the upwardly extending portion 32c into the cavity 30d, whereby the arm 32b is received in notch 30g at the end wall 30f and the stop portion is hooked at the end of the base portion. The stop portion 32 is thus retained at the end of the base portion 30 and can only be removed by moving the stop portion 32 downward relative to base portion 30 to move the upwardly extending portion 32c to at least below an upper portion of the notch 30g.

When installed at the lower rail 24, the end stop 28 (assembled with stop portion 32 attached at the base portion 30) is fastened such that the narrower portion 30c is received in the end of the guide element 36. In this position, the lower surfaces of the side walls 30e and of the stop portion 32 rest at or engage the upper surface of the bottom wall of the channel of the guide element. Thus, when the end stop 28 is installed at the lower channel 24, the stop portion 32 is hooked at the end of the base portion and cannot move downward relative to the base portion 30 (such that the arm 32b cannot be removed from the cavity 30d), and the stop portion is thus fixedly retained at the base portion and at the lower rail 24. Preferably, the attaching arm 32b and upwardly extending portion 32c of the stop portion 32 are formed to provide a snug or press-fit engagement with the side walls and end wall of the base portion 30, such that the stop portion 32 is substantially retained at the base portion 30 even before the end stop is disposed at and attached at the lower rail 24. The hollow end portion 32a of the stop portion 32 is flexible so as to provide a soft stop for the movable window panel to contact when it is moved to its fully opened or fully closed position.

Therefore, the present invention provides a two-piece end stop having a rigid plastic (or optionally metallic) base portion and a separately formed softer elastomeric stop portion that attaches at the base portion and is retained threat when the base portion is attached at the lower rail. The end stop of the present invention thus provides enhanced manufacturing by providing two separately formed elements that are readily assembled together and substantially fixed relative to one another when the end stop is attached at the lower rail, and thus the present invention avoids complex and costly two-shot molding processes to form a softer end portion of the end stop at the end of a rigid base or attaching portion.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,881,458 and/or 8,915,018, which are hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. Nos. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
    a frame portion having a lower rail;
    at least one fixed window panel that is fixed relative to said frame portion, said at least one fixed window panel defining an opening;
    a movable window panel that is movable along said frame portion, wherein said movable window panel is movable between a closed position, where said movable window panel is disposed at said opening, and an opened position, where said movable window panel is disposed at least partially along said at least one fixed window panel;
    wherein a lower end region of said movable window panel moves along a channel portion of said lower rail;
    an end stop disposed at an end of said channel portion of said lower rail, wherein said end stop comprises a rigid base portion attached at said lower rail and a resilient elastomeric stop portion attached at said base portion and configured to engage an end portion of said lower end region of said movable window panel with said movable window panel in the opened position or the closed position;
    wherein said base portion and said stop portion are separately formed in separate forming processes; and
    wherein, with said base portion of said end stop attached at said lower rail, said stop portion is not removable from said base portion.

2. The slider window assembly of claim 1, wherein a carrier is established at a lower portion of said movable window panel and wherein said stop portion of said end stop is configured to engage said carrier with said movable window panel in the opened position or the closed position.

3. The slider window assembly of claim 1, wherein said channel portion comprises a U shaped channel comprising a lower wall and a pair of spaced apart vertical walls extending from said lower wall.

4. The slider window assembly of claim 1, comprising a guide element disposed at least partially along said channel portion and configured to receive said movable window panel therein, and wherein said movable window panel is configured to move along said guide element in said channel portion of said lower rail.

5. The slider window assembly of claim 4, wherein said base portion of said end stop comprises a wider portion configured to be received in said channel portion and a narrower portion configured to be received at an end of said guide element.

6. The slider window assembly of claim 5, wherein said wider portion is attached at said channel portion.

7. The slider window assembly of claim 5, wherein, with said base portion not attached at said lower rail, said stop portion of said end stop is detachable from said base portion by moving said stop portion downward relative to said base portion.

8. The slider window assembly of claim 7, wherein, with said base portion attached at said lower rail, a lower surface of said stop portion engages said guide element so as to limit or preclude downward movement of said stop portion relative to said base portion.

9. The slider window assembly of claim 1, wherein, with said base portion not attached at said lower rail, said stop portion of said end stop is detachable from said base portion by moving said stop portion downward relative to said base portion.

10. The slider window assembly of claim 9, wherein, with said base portion attached at said lower rail, downward movement of said stop portion relative to said base portion is limited or precluded.

11. The slider window assembly of claim 1, wherein said at least one fixed window panel comprises first and second fixed window panels defining an opening therebetween.

12. The slider window assembly of claim 1, wherein said at least one fixed window panel comprises a single fixed window panel having an opening therethrough.

13. A method of manufacturing a slider window assembly for a vehicle, said method comprising:
providing at least one fixed window panel, said at least one fixed window panel defining an opening;
providing a frame portion;
attaching said frame portion to said at least one fixed window panel;
providing a movable window panel and disposing said movable window panel at said frame portion so that said movable window panel is movable along said frame portion, wherein said movable window panel is movable between a closed position, where said movable window panel is disposed at said opening, and an opened position, where said movable window panel is disposed at least partially along said at least one fixed window panel;
wherein a lower end region of said movable window panel moves along a channel portion of a lower rail of said frame portion;
providing an end stop at an end of said channel portion of said lower rail;
wherein the step of providing an end stop comprises providing a base portion and a stop portion;
wherein the step of providing said base portion and said stop portion comprises separately forming a rigid base portion and a resilient elastomeric stop portion in separate forming processes;
attaching said stop portion at said base portion;
attaching said base portion at said lower rail such that said stop portion is positioned and configured to engage an end portion of said movable window panel; and
wherein, after said base portion of said end stop is attached at said lower rail, said stop portion is not removable from said base portion.

14. The method of claim 13, comprising providing a carrier at a lower portion of said movable window panel and wherein said stop portion of said end stop is configured to engage said carrier.

15. The method of claim 13, wherein separately forming said base portion and said stop portion comprises (i) forming said base portion via injection molding a polymeric material, wherein, after said base portion is molded, said base portion comprises a rigid base portion, and (ii) forming said stop portion via injection molding an elastomeric material, wherein, after said stop portion is molded, said stop portion comprises a resilient flexible stop portion.

16. The method of claim 13, comprising providing a guide element at least partially along said channel portion for receiving said movable window panel therein, wherein said movable window panel is configured to move along said guide element in said channel portion of said lower rail, and wherein said base portion of said end stop comprises a wider portion that is received in and attached at said channel portion and a narrower portion that is received at an end of said guide element.

17. The method of claim 16, comprising detachably attaching said stop portion at said base portion and wherein, before said base portion is attached at said lower rail, said stop portion is detachable from said base portion by moving said stop portion downward relative to said base portion, and wherein, after said base portion is attached at said lower rail, a lower surface of said stop portion engages said guide element so as to limit or preclude downward movement of said stop portion relative to said base portion.

18. The method of claim 13, comprising detachably attaching said stop portion at said base portion and wherein, before said base portion is attached at said lower rail, said stop portion is detachable from said base portion by moving said stop portion downward relative to said base portion, and wherein, after said base portion is attached at said lower rail, downward movement of said stop portion relative to said base portion is limited or precluded.

19. The method of claim 13, wherein said at least one fixed window panel comprises first and second fixed window panels defining an opening therebetween.

20. The method of claim 13, wherein said at least one fixed window panel comprises a single fixed window panel having an opening therethrough.

* * * * *